US012596585B2

(12) United States Patent (10) Patent No.: US 12,596,585 B2
O'Hara et al. (45) Date of Patent: Apr. 7, 2026

(54) DATA PROCESSING AND MANAGEMENT

(71) Applicant: Twilio Inc., San Francisco, CA (US)

(72) Inventors: Christopher O'Hara, Buderim (AU); Achille Roussel, San Francisco, CA (US)

(73) Assignee: Twilio Inc., San Francisco, CA (US)

( * ) Notice: Subject to any disclaimer, the term of this patent is extended or adjusted under 35 U.S.C. 154(b) by 624 days.

(21) Appl. No.: 18/072,076

(22) Filed: Nov. 30, 2022

(65) Prior Publication Data

US 2024/0176671 A1 May 30, 2024

(51) Int. Cl.
G06F 9/46 (2006.01)
G06F 9/50 (2006.01)

(52) U.S. Cl.
CPC ............ G06F 9/505 (2013.01); G06F 9/5038 (2013.01)

(58) Field of Classification Search
CPC ............................... G06F 9/505; G06F 9/5038
See application file for complete search history.

(56) References Cited

U.S. PATENT DOCUMENTS 11,521,101 B2 * 12/2022 Marce ................. G06F 9/30058
2020/0319867 A1 * 10/2020 Ballard ..................... G06F 8/24

FOREIGN PATENT DOCUMENTS

CN          108037991 A  *  5/2018   ........... G06F 9/4881
CN          113986503 A  *  1/2022   ......... G06F 16/9024
CN          114092073 B  *  4/2022   ........... G06T 11/206

* cited by examiner

*Primary Examiner* — Diem K Cao

(74) *Attorney, Agent, or Firm* — Schwegman Lundberg & Woessner, P.A.

(57) ABSTRACT

Various embodiments include systems, methods, and non-transitory computer-readable media for managing data. Consistent with these embodiments, a method includes identifying an arbitrary graph that includes a plurality of jobs for execution; determining a retry schedule associated with the arbitrary graph; converting the arbitrary graph into a directed acyclic graph based on the plurality of retry attempts; and processing, by the execution engine, the directed acyclic graph.

18 Claims, 9 Drawing Sheets

400

IDENTIFY AN ARBITRARY GRAPH THAT INCLUDES A PLURALITY OF JOBS FOR EXECUTION — 302

DETERMINE A RETRY SCHEDULE ASSOCIATED WITH THE ARBITRARY GRAPH — 304

CONVERT THE ARBITRARY GRAPH INTO A DIRECTED ACYCLIC GRAPH BASED ON THE RETRY SCHEDULE — 306

PROCESS THE DIRECTED ACYCLIC GRAPH — 308

400

CALCULATE AN EXPECTED PROCESSING TIME BASED ON THE RETRY SCHEDULE ⟋ 402

MONITOR THE PROCESSING OF THE DIRECTED ACYCLIC GRAPH TO DETERMINE AN ACTUAL PROCESSING TIME ⟋ 404

DETERMINE A GRAPH EXECUTION STATUS BY COMPARING THE EXPECTED PROCESSING TIME WITH THE ACTUAL PROCESSING TIME ⟋ 406

500

IDENTIFY A DOWNSTREAM JOB THAT IS ASSOCIATED WITH A SET OF EDGES CONNECTING A SET OF UPSTREAM JOBS — 502

DETERMINE THAT THE SET OF EDGES EXCEEDS A THRESHOLD VALUE — 504

GROUP THE SET OF UPSTREAM JOBS BASED ON TYPES USING ONE OR MORE SHARED EDGES — 506

600

DATA PROCESSING AND MANAGEMENT

TECHNICAL FIELD

The present disclosure generally relates to data processing and management, and, more particularly, various embodiments described herein provide for systems, methods, techniques, instruction sequences, and devices that facilitate efficient data processing and job execution using a new data model.

BACKGROUND

Systems face challenges when it comes to processing data that involve loops with unmanaged retry attempts due to various reasons, including connectivity interruptions, late arriving data, data quality issues, etc. Such challenges can cause a number of issues, including system latency and unnecessary consumption of computing resources that can lead to resource starvation (e.g., memory exhaustion and crash loops).

BRIEF DESCRIPTION OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some embodiments are illustrated by way of example, and not limitation, in the figures of the accompanying drawings.

DETAILED DESCRIPTION

Figure 1:
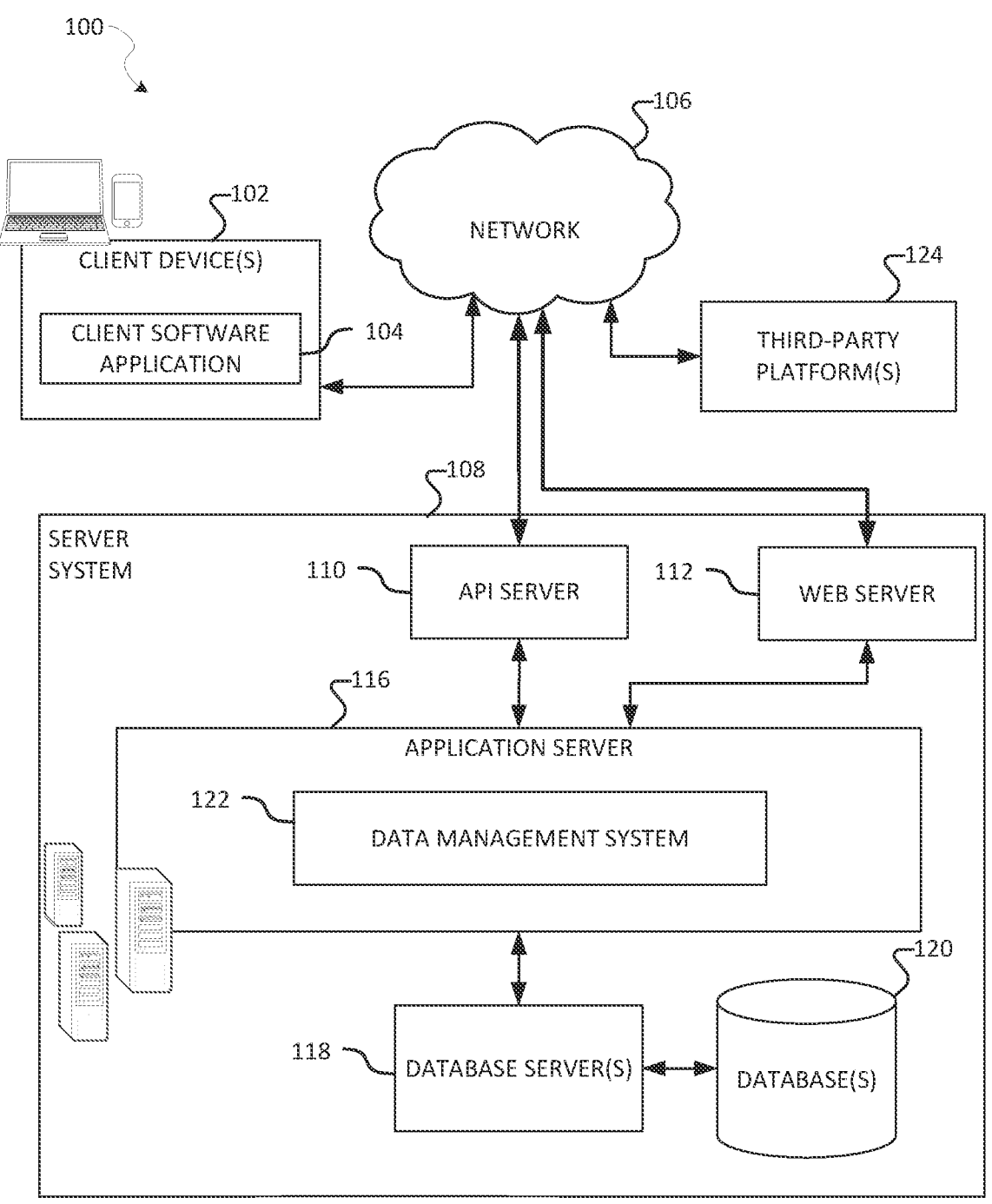
FIG. 1 is a block diagram showing an example networked environment that includes a data management system, according to various embodiments of the present disclosure.

The description that follows includes systems, methods, techniques, instruction sequences, and computing machine program products that embody illustrative embodiments of the present disclosure. In the following description, for purposes of explanation, numerous specific details are set forth in order to provide a thorough understanding of embodiments. It will be evident, however, to one skilled in the art that the present inventive subject matter may be practiced without these specific details.

Reference in the specification to "one embodiment" or "an embodiment" means that a particular feature, structure, or characteristic described in connection with the embodiment is included in at least one embodiment of the present subject matter. Thus, the appearances of the phrase "in one embodiment" or "in an embodiment" appearing in various places throughout the specification are not necessarily all referring to the same embodiment.

For purposes of explanation, specific configurations and details are set forth in order to provide a thorough understanding of the present subject matter. However, it will be apparent to one of ordinary skill in the art that embodiments of the subject matter described may be practiced without the specific details presented herein, or in various combinations, as described herein. Furthermore, well-known features may be omitted or simplified in order not to obscure the described embodiments. Various embodiments may be given throughout this description. These are merely descriptions of specific embodiments. The scope or meaning of the claims is not limited to the embodiments given.

Various examples include systems, methods, and non-transitory computer-readable media for data management that facilitate data processing using a data model. Specifically, a data management system receives event data from one or more client devices and generates an arbitrary graph (e.g., a tree structure) based on the event data. The arbitrary graph includes a plurality of jobs for execution, including one or more of an authentication job, a delivery job, and an archive job. In various embodiments, an authentication job is configured to retrieve an authentication token and pass it along to a delivery job. A delivery job transmits data (e.g., an event) to its final destination. If either the authentication or delivery job fails permanently, the event is archived in a storage unit via an archive job. In various embodiments, an arbitrary graph may or may not include loops.

In various embodiments, the data management system identifies the arbitrary graph via the execution engine and determines a retry schedule based on the arbitrary graph. The retry schedule may be determined ahead of time or at runtime and may be determined using exponential backoff. An exponential backoff algorithm may be used to determine a retry schedule. An exponential backoff algorithm exponentially retries units of work (e.g., jobs) by increasing the wait duration between retries up to a predetermined maximum backoff time.

In various embodiments, the data management system converts the arbitrary graph into a directed acyclic graph. A directed acyclic graph is a directed graph with no cycles (or loops) and includes vertices (or nodes) connected by edges. Each edge is directed from one vertex to another, such that following those directions will never form a closed loop. In various embodiments, each edge may be encoded with data (e.g., payloads, metadata, wait duration for retries, etc.) that can be passed from an upstream vertex (e.g., upstream job) to a downstream vertex (e.g., downstream job).

In various embodiments, the data management system processes the directed acyclic graph via the execution engine. Data generated during the processing may be written in the form of messages to a storage unit in a key-value store. The storage unit may be internal or external to the data management system. An external storage unit may be a cloud storage unit managed by a third-party provider. An external system may include one or more such external storage units, each of which may be a single log file that includes data written in an append-only fashion.

In various embodiments, the data management system may measure the health and performance of the execution engine by monitoring the graph execution time. Specifically, the data management system calculates an expected processing time based on the retry schedule. The management system monitors the processing of the directed acyclic graph to determine an actual processing time and determines a graph execution status by comparing the expected processing time with the actual processing time. Based on the graph execution status, the data management system may determine the performance of the execution engine. For example, if the expected processing time is shorter than the actual processing time by more than a threshold value, the execution engine can be determined to be underperforming. The graph execution status may trigger an alert to a system administrator or an authorized user for further evaluation.

In various embodiments, a shared edge may be used when the directed acyclic graph grows in complexity over time, such as including a large number of jobs. In such a scenario, the number of edges may become untenable where too many edges connect to a single vertex (e.g., job). For example, for a directed acyclic graph with three types of jobs, if three retry attempts are configured for each job, the graph may include 17 edges, whereas if ten retry attempts are configured for each job, the graph may include 66 edges. In order to reduce the complexity of the graph, the data management system may identify a set of retry attempts of a job from the plurality of jobs in the directed acyclic graph. If the set of retry attempts is determined to exceed a threshold retry attempts (e.g., ten retry attempts), the data management system may group the set of retry attempts of the job using a shared edge.

In various embodiments, the data management system identifies a downstream job in the directed acyclic graph. The downstream job is associated with a set of edges that connects a set of upstream jobs in the graph. The data management system determines that the set of edges exceeds a threshold value. Based on the determination, the data management system groups the set of upstream jobs based on types using one or more shared edges. For example, the set of upstream jobs may include three authentication jobs generated based on three retry attempts and three delivery jobs generated based on three retry attempts. The downstream job may be an archive job that is connected by six edges. In various embodiments, the threshold value is configured as five. Upon determining that the six is greater than the threshold value five, the data management system groups the three authentication jobs using one shared edge and groups the three delivery jobs using another shared edge. After the grouping, the archive job connects with the six jobs (i.e., three authentication jobs and three delivery jobs) via two edges. This approach helps to solve the edge explosion issues, especially when the directed acyclic graph becomes more complex as the number of jobs continues to grow.

Reference will now be made in detail to embodiments of the present disclosure, examples of which are illustrated in the appended drawings. The present disclosure may, however, be embodied in many different forms and should not be construed as being limited to the embodiments set forth herein.

FIG. 1 is a block diagram showing an example networked environment 100 that includes a data management system 122, according to various embodiments of the present disclosure. By including the data management system 122, the networked environment 100 can facilitate efficient data processing and job execution using a new data model in high throughput and multifaceted networked environment as described herein. As shown, the networked environment 100 includes one or more client devices 102, a server system 108, and a network 106 (e.g., including Internet, wide-area-network (WAN), local-area-network (LAN), wireless network, etc) that are communicatively coupled together. Each client device 102 can host a number of applications, including a client software application 104. The client software application 104 can communicate data with the server system 108 via a network 106. Accordingly, the client software application 104 can communicate and exchange data with the server system 108 via network 106.

The server system 108 provides server-side functionality via the network 106 to the client software application 104. While certain functions of the networked environment 100 are described herein as being performed by the data management system 122 on server system 108, it will be appreciated that the location of certain functionality within server system 108 is a design choice. For example, it may be technically preferable to initially deploy certain technology and functionality within the server system 108, but later migrate this technology and functionality to the client software application 104.

With respect to server system 108, each Application Program Interface (API) server 110 and web server 112 is coupled to an application server 116, which hosts the data management system 122. The application server 116 is communicatively coupled to a database server 118, which facilitates access to a database 120 that stores data associated with the application server 116, including data that may be generated or used by the data management system 122, in various embodiments.

The API server 110 receives and transmits data (e.g., API calls, commands, requests, responses, and authentication data) between the client device 102 and the application server 116, and between the one or more services and the application server 116. Specifically, the API server 110 provides a set of interfaces (e.g., endpoint, routines, or protocols) that can be called or queried by the client software application 104 or the one or more services in order to invoke the functionalities of the application server 116. The API server 110 exposes various functions supported by the application server 116, including without limitation: user registration; login functionality; data object operations (e.g., extraction, generating, storing, retrieving, encrypting, decrypting, transferring, access rights, licensing, etc.), and user communications.

Through one or more web-based interfaces (e.g., web-based user interfaces), the web server 112 can support various functions of the data management system 122 of the application server 116. In various embodiments, the deployment or implementation of the web server 112 and the application server 116 may share the same set of executable code. In various embodiments, the web server 112 may be a subsystem or a component of the application server 116.

The application server 116 hosts a number of applications and subsystems, including the data management system 122, which supports various functions and services with respect to various embodiments described herein. The application server 116 is communicatively coupled to a database server 118, which facilitates access to database(s) 120 that stores data associated with the data management system 122.

The third-party platform 124 may host an external system that includes one or more storage units. Each storage unit may be a single log file that includes data written in an append-only fashion. Data generated by the data management system 122 may be written in the form of messages to one or more storage units.

Figure 2:
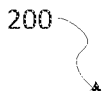
FIG. 2 is a block diagram illustrating an example data management system, according to various embodiments of the present disclosure.
Figure 2:
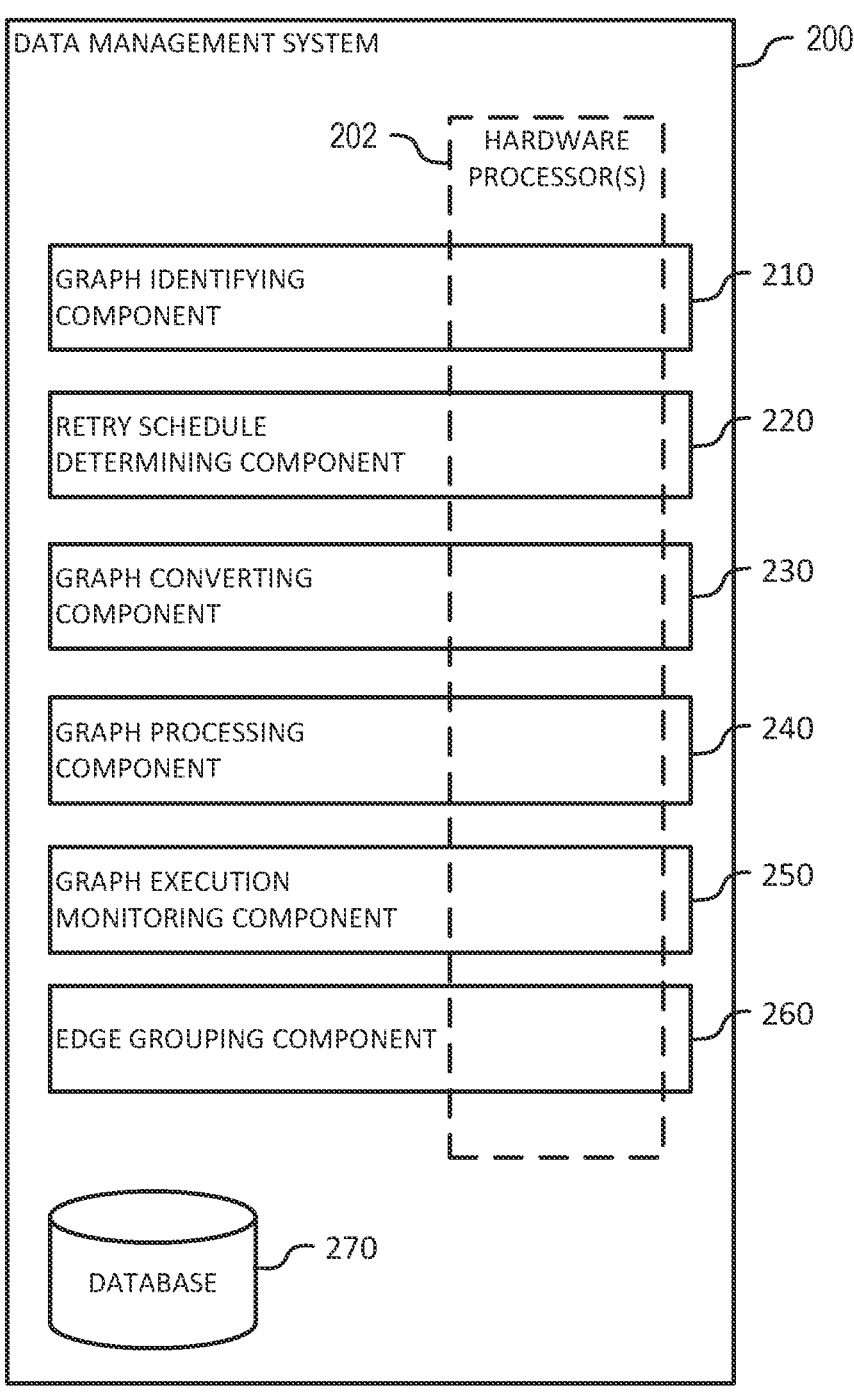

FIG. 2 is a block diagram illustrating an example data management system 200, according to various embodiments of the present disclosure. For some embodiments, the data management system 200 represents an example of the data management system 122 described with respect to FIG. 1. As shown, the data management system 200 comprises a graph identifying component 210, a retry schedule determining component 220, a graph converting component 230, a graph processing component 240, a graph execution monitoring component 250, and an edge grouping component 260. According to various embodiments, one or more of the graph identifying component 210, the retry schedule determining component 220, the graph converting component 230, the graph processing component 240, the graph execution monitoring component 250, and the edge grouping component 260 are implemented by one or more hardware processors 202. Data generated by one or more of the graph identifying component 210, the retry schedule determining component 220, the graph converting component 230, the graph processing component 240, the graph execution monitoring component 250, and the edge grouping component 260 are stored in a database 270 of the data management system 200.

In various embodiments, the graph identifying component 210 is configured to identify an arbitrary graph. The arbitrary graph (e.g., a tree structure) may be generated based on event data received from one or more client devices. The arbitrary graph may include a plurality of jobs for execution, including one or more of an authentication job, a delivery job, and an archive job.

In various embodiments, the retry schedule determining component 220 is configured to determine a retry schedule based on the arbitrary graph. The retry schedule may be determined ahead of time or at runtime and may be determined using an exponential backoff algorithm.

In various embodiments, the graph converting component 230 is configured to convert the arbitrary graph into a directed acyclic graph. A directed acyclic graph is a directed graph with no cycles (or loops) and includes vertices (or nodes) connected by edges. In various embodiments, each edge may be encoded with data (e.g., payloads, metadata, wait duration for retries, etc.) that can be passed from an upstream vertex (e.g., upstream job) to a downstream vertex (e.g., downstream job).

In various embodiments, the graph processing component 240 is configured to process the directed acyclic graph via the execution engine. Data generated during the processing may be written in the form of messages to a storage unit in a key-value store.

In various embodiments, the graph execution monitoring component 250 is configured to calculate an expected processing time based on the retry schedule. The graph execution monitoring component 250 is further configured to monitor the processing of the directed acyclic graph to determine an actual processing time and determine a graph execution status by comparing the expected processing time with the actual processing time. Based on the graph execution status, the graph execution monitoring component 250 may determine the performance of the execution engine.

In various embodiments, the edge grouping component 260 is configured to identify a set of retry attempts of a job from the plurality of jobs in the directed acyclic graph. Upon determining that the set of retry attempts exceeds a threshold retry attempts (e.g., ten retry attempts), the edge grouping component 260 is configured to group the set of retry attempts of the job using a shared edge.

Figure 3:
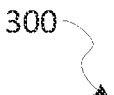
FIG. 3 is a flowchart illustrating an example method for data processing and management, according to various embodiments of the present disclosure.
Figure 3:
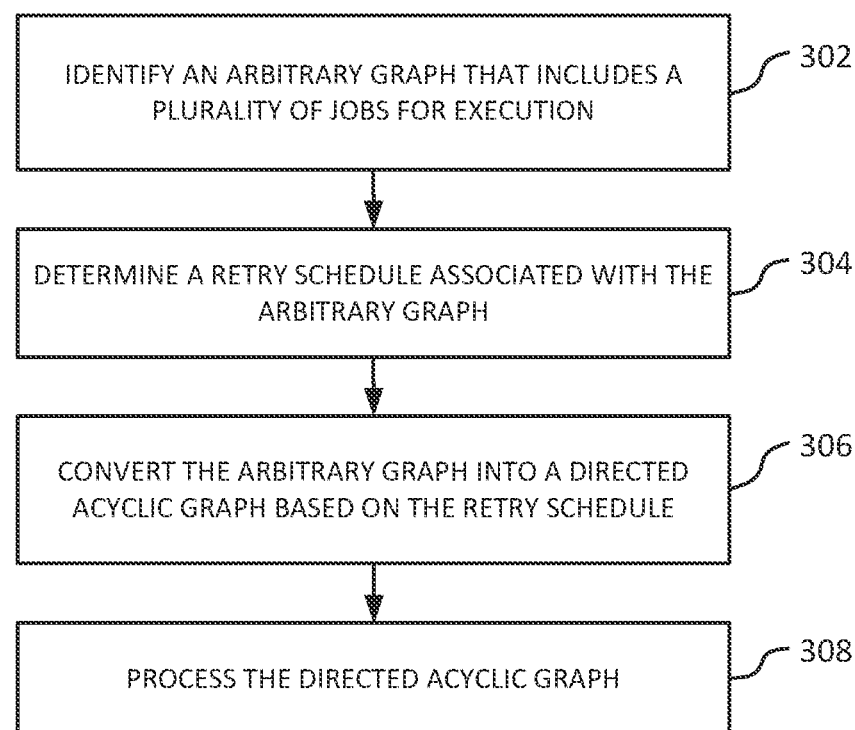

FIG. 3 is a flowchart illustrating an example method 300 for data processing and management, according to various embodiments of the present disclosure. It will be understood that example methods described herein may be performed by a machine in accordance with some embodiments. For example, the method 300 can be performed by the data management system 122 described with respect to FIG. 1, the data management system 200 described with respect to FIG. 2, or individual components thereof. An operation of various methods described herein may be performed by one or more hardware processors (e.g., central processing units or graphics processing units) of a computing device (e.g., a desktop, server, laptop, mobile phone, tablet, etc.), which may be part of a computing system based on a cloud architecture. Example methods described herein may also be implemented in the form of executable instructions stored on a machine-readable medium or in the form of electronic circuitry. For instance, the operations of method 300 may be represented by executable instructions that, when executed by a processor of a computing device, cause the computing device to perform method 300. Depending on the embodiment, an operation of an example method described herein may be repeated in different ways or involve intervening operations not shown. Though the operations of example methods may be depicted and described in a certain order, the order in which the operations are performed may vary among embodiments, including performing certain operations in parallel.

At operation 302, a processor identifies an arbitrary graph. The arbitrary graph (e.g., a tree structure) may be generated based on event data received from one or more client devices. The arbitrary graph may include a plurality of jobs for execution, including one or more of an authentication job, a delivery job, and an archive job. In various embodiments, an authentication job is configured to retrieve an authentication token and pass it along to a delivery job. A delivery job transmits data (e.g., an event) to its final destination. If either the authentication or delivery job fails permanently, the event is archived in a storage unit via an archive job.

At operation 304, a processor determines a retry schedule based on the arbitrary graph. The retry schedule may be determined ahead of time or at runtime and may be determined using exponential backoff. An exponential backoff algorithm may be used to exponentially retry units of work (e.g., jobs) by increasing the wait duration between retries up to a predetermined maximum backoff time.

At operation 306, a processor converts the arbitrary graph into a directed acyclic graph. A directed acyclic graph is a directed graph with no cycles (or loops) and includes vertices (or nodes) connected by edges. Each edge is directed from one vertex to another, such that following those directions will never form a closed loop. In various embodiments, each edge may be encoded with data (e.g., payloads, metadata, wait duration for retries, etc.) that can be passed from an upstream vertex (e.g., upstream job) to a downstream vertex (e.g., downstream job).

At operation 308, a processor processes the directed acyclic graph via the execution engine. Data generated during the processing may be written in the form of messages in a storage unit in a key-value store. The storage unit may be internal or external to the data management system.

An external storage unit may be a cloud storage unit managed by a third-party provider.

Though not illustrated, the method 300 can include an operation where a graphical user interface for managing data can be displayed (or caused to be displayed) by the hardware processor. For instance, the operation can cause a computing device to display the graphical user interface for managing data. This operation for displaying the graphical user interface can be separate from operations 302 through 308 or, alternatively, form part of one or more of operations 302 through 308.

Figure 4:
FIG. 4 is a flowchart illustrating an example method for data processing and management, according to various embodiments of the present disclosure.
Figure 4:
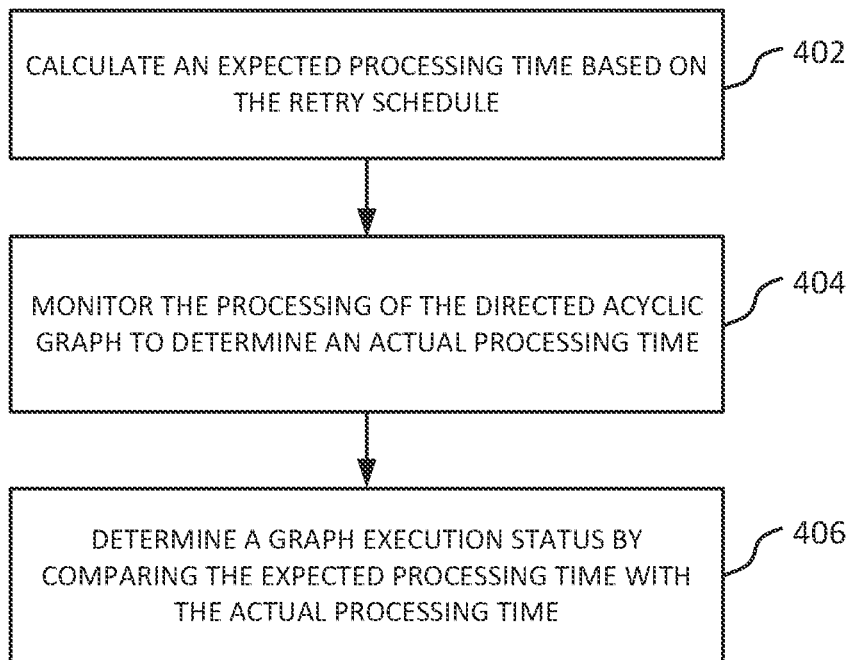

FIG. 4 is a flowchart illustrating an example method 400 for data processing and management, according to various embodiments of the present disclosure. It will be understood that example methods described herein may be performed by a machine in accordance with some embodiments. For example, the method 400 can be performed by the data management system 122 described with respect to FIG. 1, the data management system 200 described with respect to FIG. 2, or individual components thereof. An operation of various methods described herein may be performed by one or more hardware processors (e.g., central processing units or graphics processing units) of a computing device (e.g., a desktop, server, laptop, mobile phone, tablet, etc.), which may be part of a computing system based on a cloud architecture. Example methods described herein may also be implemented in the form of executable instructions stored on a machine-readable medium or in the form of electronic circuitry. For instance, the operations of method 400 may be represented by executable instructions that, when executed by a processor of a computing device, cause the computing device to perform method 400. Depending on the embodiment, an operation of an example method described herein may be repeated in different ways or involve intervening operations not shown. Though the operations of example methods may be depicted and described in a certain order, the order in which the operations are performed may vary among embodiments, including performing certain operations in parallel.

In various embodiments, one or more operations of the method 400 may be a sub-routine of one or more of the operations of method 300. In various embodiments, one or more operations in method 400 may be performed subsequent to the operations of method 300.

At operation 402, a processor calculates an expected processing time based on the retry schedule.

At operation 404, a processor monitors the processing of the directed acyclic graph to determine an actual processing time and determines a graph execution status by comparing the expected processing time with the actual processing time.

At operation 406, based on the graph execution status, a processor determines the performance of the execution engine.

In various embodiments, when the directed acyclic graph is read from a storage unit in a key-value store, a timestamp associated with the storage unit may be written into the operation to schedule execution. The timestamp represents the time that the execution is expected. If a processor determines that the timestamp represents a time that is now or in the past, the processor schedules execution immediately. If the processor determines that the timestamp represents a time in the future, it defers execution. When execution is complete, the processor emits a "result" operation that carries the same timestamp. The processor then uses the timestamp as the base for follow-up execution (e.g., retry attempts). When the processor executes the graph by following the edges, the processor writes an operation based on "Timestamp=PreviousTimestamp+EdgeWaitDuration." In various embodiments, the processor may use timestamps, as described herein, to determine the expected processing time of the directed acyclic graph, or particular jobs contained therein.

Though not illustrated, the method 400 can include an operation where a graphical user interface for managing data using persistent storage can be displayed (or caused to be displayed) by the hardware processor. For instance, the operation can cause a computing device to display the graphical user interface for managing data. This operation for displaying the graphical user interface can be separate from operations 402 through 406 or, alternatively, form part of one or more of operations 402 through 406.

Figure 5:
FIG. 5 is a flowchart illustrating an example method for data processing and management, according to various embodiments of the present disclosure.
Figure 5:
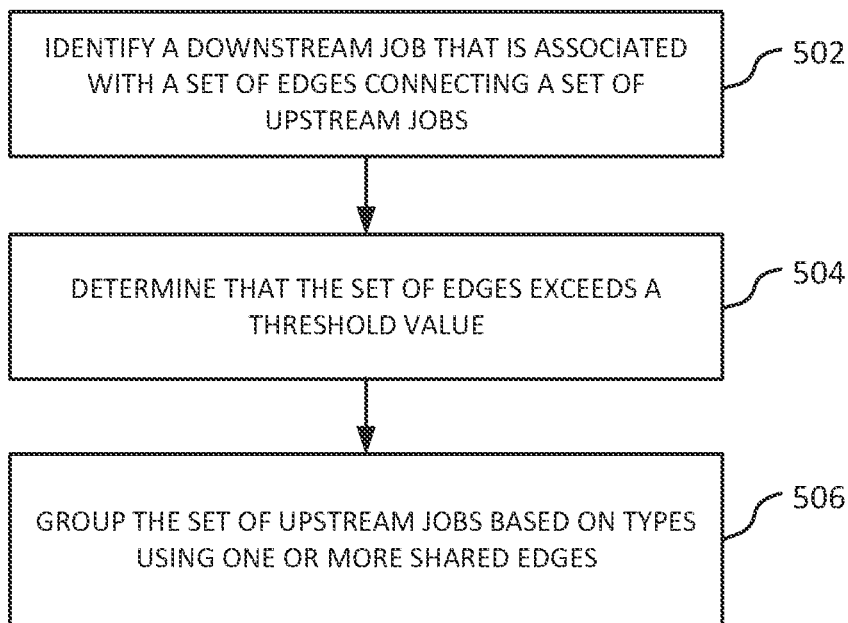

FIG. 5 is a flowchart illustrating an example method 500 for data processing and management, according to various embodiments of the present disclosure. It will be understood that example methods described herein may be performed by a machine in accordance with some embodiments. For example, the method 500 can be performed by the data management system 122 described with respect to FIG. 1, the data management system 200 described with respect to FIG. 2, or individual components thereof. An operation of various methods described herein may be performed by one or more hardware processors (e.g., central processing units or graphics processing units) of a computing device (e.g., a desktop, server, laptop, mobile phone, tablet, etc.), which may be part of a computing system based on a cloud architecture. Example methods described herein may also be implemented in the form of executable instructions stored on a machine-readable medium or in the form of electronic circuitry. For instance, the operations of method 500 may be represented by executable instructions that, when executed by a processor of a computing device, cause the computing device to perform method 500. Depending on the embodiment, an operation of an example method described herein may be repeated in different ways or involve intervening operations not shown. Though the operations of example methods may be depicted and described in a certain order, the order in which the operations are performed may vary among embodiments, including performing certain operations in parallel.

In various embodiments, one or more operations of the method 500 may be a sub-routine of one or more of the operations of method 300. In various embodiments, one or more operations in method 500 may be performed subsequent to the operations of method 300.

At operation 502, a processor identifies a downstream job in the directed acyclic graph. The downstream job is associated with a set of edges that connects a set of upstream jobs in the graph.

At operation 504, a processor determines that the set of edges exceeds a threshold value. The threshold value may be configured by the data management system or be provided by a client via a client device.

At operation 506, based on the determination that the set of edges exceeds the threshold value, a processor groups the set of upstream jobs based on types using one or more shared edges. For example, the set of upstream jobs may include three authentication jobs generated based on three retry attempts and three delivery jobs generated based on three retry attempts. The downstream job may be an archive job that is connected by six edges. In various embodiments, the threshold value is configured as five. Upon determining that the six is greater than the threshold value five, the data management system groups the three authentication jobs using one shared edge and groups the three delivery jobs using another shared edge. After the grouping, the archive job connects with the six jobs (i.e., three authentication jobs and three delivery jobs) via two edges. This approach helps to solve the edge explosion issues, especially when the directed acyclic graph becomes more complex as the number of jobs continues to grow.

Though not illustrated, the method 500 can include an operation where a graphical user interface for managing data using persistent storage can be displayed (or caused to be displayed) by the hardware processor. For instance, the operation can cause a computing device to display the graphical user interface for managing data. This operation for displaying the graphical user interface can be separate from operations 502 through 506 or, alternatively, form part of one or more of operations 502 through 506.

Figure 6:
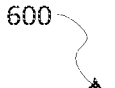
FIG. 6 is a block diagram illustrating an example directed acyclic graph managed by an example data management system during operation, according to various embodiments of the present disclosure.

FIG. 6 is a block diagram illustrating an example directed acyclic graph 600 managed by an example data management system during operation, according to various embodiments of the present disclosure. As shown, the example directed acyclic graph 600 includes a plurality of vertices that are connected by a plurality of edges (e.g., directed edges). Each job is represented by a vertex in the graph. The example directed acyclic graph 600 includes three types of jobs. As shown, each type of job is configured with three retry attempts. The three types of jobs include authorization jobs (e.g., jobs 602, 604, 606), delivery jobs (e.g., jobs 608, 610, 612), and archive jobs (e.g., jobs 614, 616, 618). The arrow direction represents the flow of execution and data. Therefore, job 614 is a downstream job relative to jobs 602-612.

In various embodiments, the data management system, based at least on an exponential backoff algorithm, may configure up to 10 retry attempts for each job in a directed acyclic graph. The wait duration between each retry attempt may also be determined based on the exponential backoff algorithm. In various embodiments, the number of retry attempts for jobs and the wait duration for each attempt may be determined by a client via a client device or based on an application external to the data management system, as described herein.

An edge explosion situation may occur where a vertex (or job) is connected with a large number of edges. To mitigate, the data management system may identify a set of retry attempts (e.g., jobs 602, 604, 606, representing three retry attempts) of a particular type of job (e.g., authentication job) in the directed acyclic graph. If the set of retry attempts is determined to exceed a threshold retry attempts (e.g., two retry attempts), the data management system may group the set of retry attempts of the job using a shared edge (e.g., edge 702, as illustrated in FIG. 7).

In various embodiments, the data management system identifies a downstream job (e.g., job 614) in the directed acyclic graph. The downstream job (e.g., job 614) is associated with a set of edges (e.g., six edges, pointing to job 614) that connects a set of upstream jobs (e.g., jobs 602-612) in the graph. The data management system determines that the set of edges exceeds a threshold value (e.g., four). Based on the determination, the data management system groups the set of upstream jobs (e.g., jobs 602-612) based on types using one or more shared edges (e.g., edges 702 and 704, as illustrated in FIG. 7).

Figure 7:
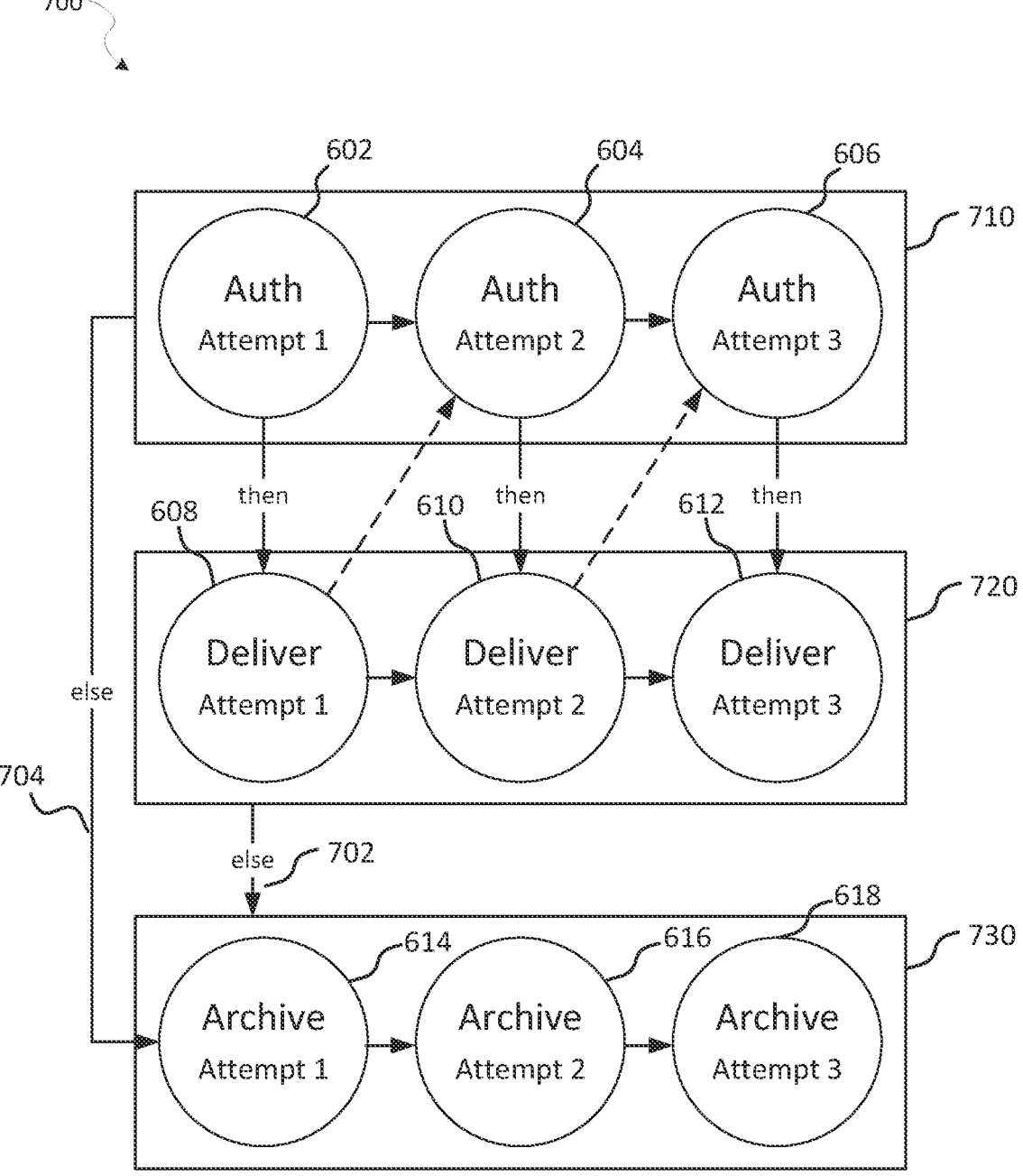
FIG. 7 is a block diagram illustrating an example directed acyclic graph managed by an example data management system during operation, according to various embodiments of the present disclosure.

FIG. 7 is a block diagram illustrating an example directed acyclic graph 700 managed by an example data management system during operation, according to various embodiments of the present disclosure. As shown, the example directed acyclic graph 700 includes a plurality of jobs (e.g., jobs 602-618) with shared edges (e.g., edges 702 and 704). The plurality of jobs is divided into three groups (e.g., groups 710, 720, and 730) based on the types of jobs. As described herein, using shared edges help solve the edge explosion issues, especially when the directed acyclic graph becomes more complex as the number of jobs continues to grow.

Figure 8:
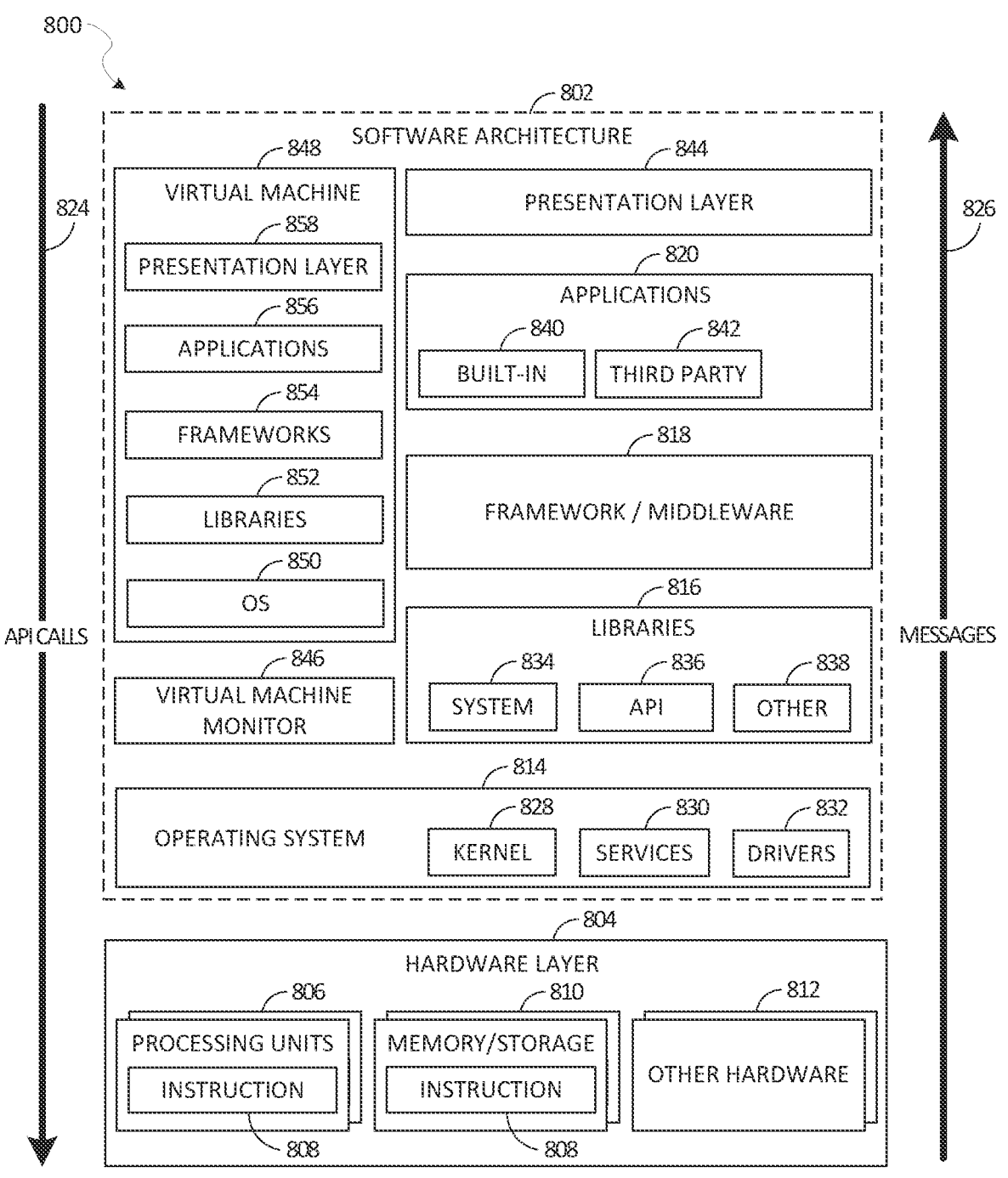
FIG. 8 is a block diagram illustrating a representative software architecture, which may be used in conjunction with various hardware architectures herein described, according to various embodiments of the present disclosure.

FIG. 8 is a block diagram illustrating an example of a software architecture 802 that may be installed on a machine, according to some example embodiments. FIG. 8 is merely a non-limiting example of software architecture, and it will be appreciated that many other architectures may be implemented to facilitate the functionality described herein. The software architecture 802 may be executing on hardware such as a machine 900 of FIG. 9 that includes, among other things, processors 910, memory 930, and input/output (I/O) components 950. A representative hardware layer 804 is illustrated and can represent, for example, the machine 900 of FIG. 9. The representative hardware layer 804 comprises one or more processing units 806 having associated executable instructions 808. The executable instructions 808 represent the executable instructions of the software architecture 802. The hardware layer 804 also includes memory or storage modules 810, which also have the executable instructions 808. The hardware layer 804 may also comprise other hardware 812, which represents any other hardware of the hardware layer 804, such as the other hardware illustrated as part of the machine 800.

In the example architecture of FIG. 8, the software architecture 802 may be conceptualized as a stack of layers, where each layer provides particular functionality. For example, the software architecture 802 may include layers such as an operating system 814, libraries 816, frameworks/middleware 818, applications 820, and a presentation layer 844. Operationally, the applications 820 or other components within the layers may invoke API calls 824 through the software stack and receive a response, returned values, and so forth (illustrated as messages 826) in response to the API calls 824. The layers illustrated are representative in nature, and not all software architectures have all layers. For example, some mobile or special-purpose operating systems may not provide a frameworks/middleware 818 layer, while others may provide such a layer. Other software architectures may include additional or different layers.

The operating system 814 may manage hardware resources and provide common services. The operating system 814 may include, for example, a kernel 828, services 830, and drivers 832. The kernel 828 may act as an abstraction layer between the hardware and the other software layers. For example, the kernel 828 may be responsible for memory management, processor management (e.g., scheduling), component management, networking, security settings, and so on. The services 830 may provide other common services for the other software layers. The drivers 832 may be responsible for controlling or interfacing with the underlying hardware. For instance, the drivers 832 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 816 may provide a common infrastructure that may be utilized by the applications 820 and/or other components and/or layers. The libraries 816 typically provide functionality that allows other software modules to perform tasks in an easier fashion than by interfacing directly with the underlying operating system 814 functionality (e.g., kernel 828, services 830, or drivers 832). The libraries 816 may include system libraries 834 (e.g., C standard library) that may provide functions such as memory allocation functions, string manipulation functions, mathematic functions, and the like. In addition, the libraries 816 may include API libraries 836 such as media libraries (e.g., libraries to support presentation and manipulation of various media formats such as MPEG4, H.264, MP3, AAC, AMR, JPG, and PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 816 may also include a wide variety of other libraries 838 to provide many other APIs to the applications 820 and other software components/modules.

The frameworks 818 (also sometimes referred to as middleware) may provide a higher-level common infrastructure that may be utilized by the applications 820 or other software components/modules. For example, the frameworks 818 may provide various graphical user interface functions, high-level resource management, high-level location services, and so forth. The frameworks 818 may provide a broad spectrum of other APIs that may be utilized by the applications 820 and/or other software components/modules, some of which may be specific to a particular operating system or platform.

The applications 820 include built-in applications 840 and/or third-party applications 842. Examples of representative built-in applications 840 may include, but are not limited to, a home application, a contacts application, a browser application, a book reader application, a location application, a media application, a messaging application, or a game application.

The third-party applications 842 may include any of the built-in applications 840, as well as a broad assortment of other applications. In a specific example, the third-party applications 842 (e.g., an application developed using the Android™ or iOS™ software development kit (SDK) by an entity other than the vendor of the particular platform) may be mobile software running on a mobile operating system such as iOS™, Android™, or other mobile operating systems. In this example, the third-party applications 842 may invoke the API calls 824 provided by the mobile operating system such as the operating system 814 to facilitate functionality described herein.

The applications 820 may utilize built-in operating system functions (e.g., kernel 828, services 830, or drivers 832), libraries (e.g., system libraries 834, API libraries 836, and other libraries 838), or frameworks/middleware 818 to create user interfaces to interact with users of the system. Alternatively, or additionally, in some systems, interactions with a user may occur through a presentation layer, such as the presentation layer 844. In these systems, the application/module "logic" can be separated from the aspects of the application/module that interact with the user.

Some software architectures utilize virtual machines. In the example of FIG. 8, this is illustrated by a virtual machine 848. The virtual machine 848 creates a software environment where applications/modules can execute as if they were executing on a hardware machine (e.g., the machine 900 of FIG. 9). The virtual machine 848 is hosted by a host operating system (e.g., the operating system 814) and typically, although not always, has a virtual machine monitor 846, which manages the operation of the virtual machine 848 as well as the interface with the host operating system (e.g., the operating system 814). A software architecture executes within the virtual machine 848, such as an operating system 850, libraries 852, frameworks/middleware 854, applications 856, or a presentation layer 858. These layers of software architecture executing within the virtual machine 848 can be the same as corresponding layers previously described or may be different.

Figure 9:
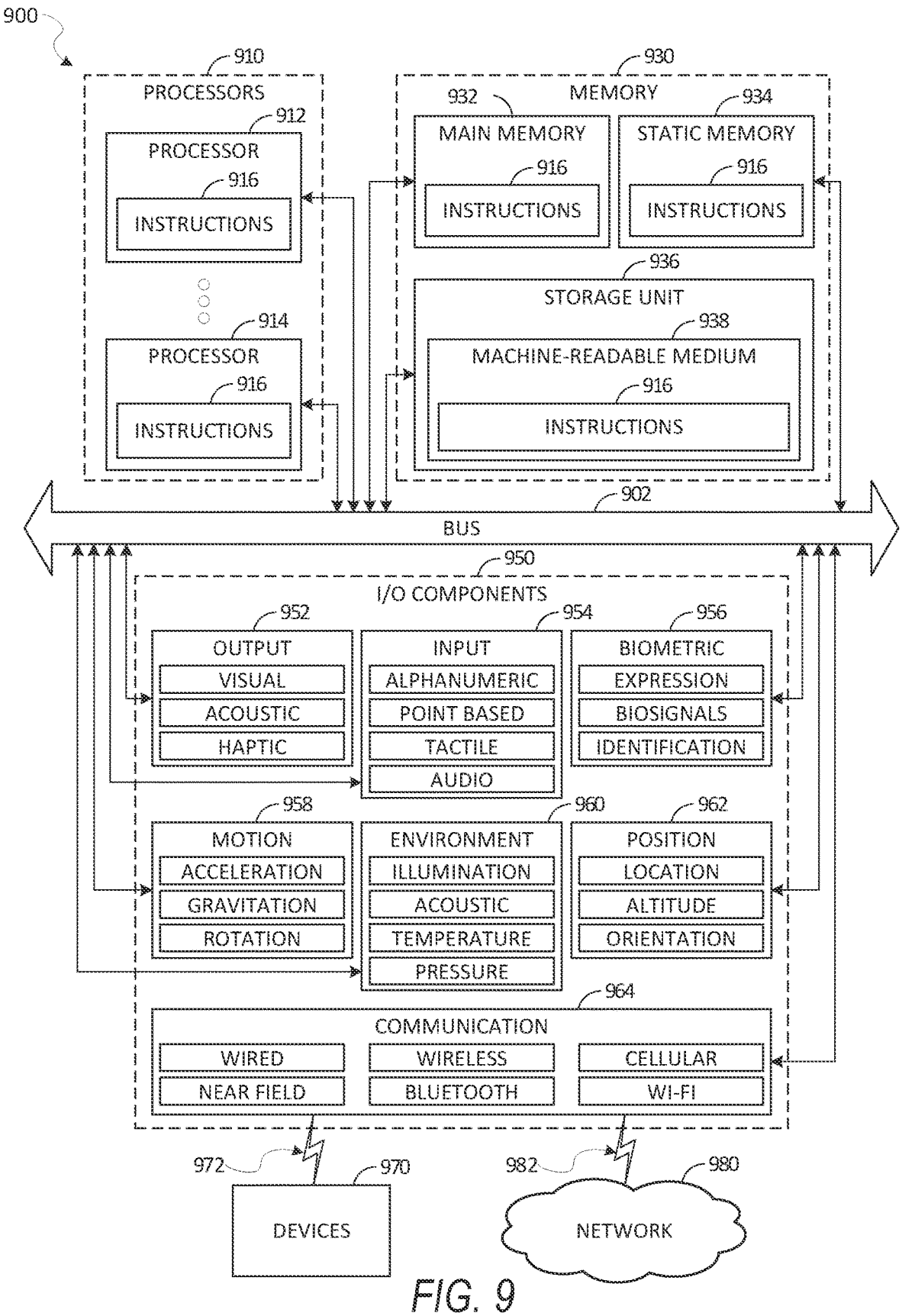
FIG. 9 is a block diagram illustrating components of a machine able to read instructions from a machine storage medium and perform any one or more of the methodologies discussed herein according to various embodiments of the present disclosure.

FIG. 9 illustrates a diagrammatic representation of a machine 900 in the form of a computer system within which a set of instructions may be executed for causing the machine 900 to perform any one or more of the methodologies discussed herein, according to an embodiment. Specifically, FIG. 9 shows a diagrammatic representation of the machine 900 in the example form of a computer system, within which instructions 916 (e.g., software, a program, an application, an applet, an app, or other executable code) for causing the machine 900 to perform any one or more of the methodologies discussed herein may be executed. For example, the instructions 916 may cause the machine 900 to execute the method 300 described above with respect to FIG. 3, the method 400 described above with respect to FIG. 4, and the method 500 described above with respect to FIG. 5. Instructions 916 transform the general, non-programmed machine 900 into a particular machine 900 programmed to carry out the described and illustrated functions in the manner described. In alternative embodiments, the machine 900 operates as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a personal digital assistant (PDA), an entertainment media system, a cellular telephone, a smart phone, a mobile device, or any machine capable of executing the instructions 916, sequentially or otherwise, that specify actions to be taken by the machine 900. Further, while only a single machine 900 is illustrated, the term "machine" shall also be taken to include a collection of machines 900 that individually or jointly execute the instructions 916 to perform any one or more of the methodologies discussed herein.

The machine 900 may include processors 910, memory 930, and I/O components 950, which may be configured to communicate with each other such as via a bus 902. In an embodiment, the processors 910 (e.g., a hardware processor, such as a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 912 and a processor 914 that may execute the instructions 916. The term "processor" is intended to include multi-core processors that may comprise two or more independent processors (sometimes referred to as "cores") that may execute instructions contemporaneously. Although FIG. 9 shows multiple processors 910, the machine 900 may include a single processor with a single core, a single processor with multiple cores (e.g., a multi-core processor), multiple processors with a single core, multiple processors with multiples cores, or any combination thereof.

The memory 930 may include a main memory 932, a static memory 934, and a storage unit 936 including machine-readable medium 938, each accessible to the processors 910 such as via the bus 902. The main memory 932, the static memory 934, and the storage unit 936 store the instructions 916 embodying any one or more of the methodologies or functions described herein. The instructions 916 may also reside, completely or partially, within the main memory 932, within the static memory 934, within the storage unit 936, within at least one of the processors 910 (e.g., within the processor's cache memory), or any suitable combination thereof, during execution thereof by the machine 900.

The I/O components 950 may include a wide variety of components to receive input, provide output, produce output, transmit information, exchange information, capture measurements, and so on. The specific I/O components 950 that are included in a particular machine will depend on the type of machine. For example, portable machines such as mobile phones will likely include a touch input device or other such input mechanisms, while a headless server machine will likely not include such a touch input device. It will be appreciated that the I/O components 950 may include many other components that are not shown in FIG. 9. The I/O components 950 are grouped according to functionality merely for simplifying the following discussion, and the grouping is in no way limiting. In various embodiments, the I/O components 950 may include output components 952 and input components 954. The output components 952 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 954 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further embodiments, the I/O components 950 may include biometric components 956, motion components 958, environmental components 960, or position components 962, among a wide array of other components. The motion components 958 may include acceleration sensor components (e.g., accelerometer), gravitation sensor components, rotation sensor components (e.g., gyroscope), and so forth. The environmental components 960 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 962 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 950 may include communication components 964 operable to couple the machine 900 to a network 980 or devices 970 via a coupling 982 and a coupling 972, respectively. For example, the communication components 964 may include a network interface component or another suitable device to interface with the network 980. In further examples, the communication components 964 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 970 may be another machine or any of a wide variety of peripheral devices (e.g., a peripheral device coupled via a USB).

Moreover, the communication components 964 may detect identifiers or include components operable to detect identifiers. For example, the communication components 964 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 964, such as location via Internet Protocol (IP) geolocation, location via Wi-Fi® signal triangulation, location via detecting an NFC beacon signal that may indicate a particular location, and so forth.

Certain embodiments are described herein as including logic or a number of components, modules, elements, or mechanisms. Such modules can constitute either software modules (e.g., code embodied on a machine-readable medium or in a transmission signal) or hardware modules. A "hardware module" is a tangible unit capable of performing certain operations and can be configured or arranged in a certain physical manner. In various example embodiments, one or more computer systems (e.g., a standalone computer system, a client computer system, or a server computer system) or one or more hardware modules of a computer system (e.g., a processor or a group of processors) are configured by software (e.g., an application or application portion) as a hardware module that operates to perform certain operations as described herein.

In some embodiments, a hardware module is implemented mechanically, electronically, or any suitable combination thereof. For example, a hardware module can include dedicated circuitry or logic that is permanently configured to perform certain operations. For example, a hardware module can be a special-purpose processor, such as a field-programmable gate array (FPGA) or an ASIC. A hardware module may also include programmable logic or circuitry that is temporarily configured by software to perform certain operations. For example, a hardware module can include software encompassed within a general-purpose processor or other programmable processor. It will be appreciated that the decision to implement a hardware module mechanically, in dedicated and permanently configured circuitry, or in temporarily configured circuitry (e.g., configured by software) can be driven by cost and time considerations.

Accordingly, the phrase "module" should be understood to encompass a tangible entity, be that an entity that is physically constructed, permanently configured (e.g., hard-wired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software can accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In embodiments in which multiple hardware modules are configured or instantiated at different times, communications between or among such hardware modules may be achieved, for example, through the storage and retrieval of information in memory structures to which the multiple hardware modules have access. For example, one hardware module performs an operation and stores the output of that operation in a memory device to which it is communicatively coupled. A further hardware module can then, at a later time, access the memory device to retrieve and process the stored output. Hardware modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors constitute processor-implemented modules that operate to perform one or more operations or functions described herein. As used herein, "processor-implemented module" refers to a hardware module implemented using one or more processors.

Similarly, the methods described herein can be at least partially processor-implemented, with a particular processor or processors being an example of hardware. For example, at least some of the operations of a method can be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines 900 including processors 910), with these operations being accessible via a network (e.g., the Internet) and via one or more appropriate interfaces (e.g., an API). In certain embodiments, for example, a client device may relay or operate in communication with cloud computing systems and may access circuit design information in a cloud environment.

The performance of certain of the operations may be distributed among the processors, not only residing within a single machine 900, but deployed across a number of machines 900. In some example embodiments, the processors 910 or processor-implemented modules are located in a single geographic location (e.g., within a home environment, an office environment, or a server farm). In other example embodiments, the processors or processor-implemented modules are distributed across a number of geographic locations Executable Instructions and Machine Storage Medium The various memories (i.e., 930, 932, 934, and/or the memory of the processor(s) 910) and/or the storage unit 936 may store one or more sets of instructions 916 and data structures (e.g., software) embodying or utilized by any one or more of the methodologies or functions described herein. These instructions (e.g., the instructions 916), when executed by the processor(s) 910, cause various operations to implement the disclosed embodiments.

As used herein, the terms "machine-storage medium," "device-storage medium," and "computer-storage medium" mean the same thing and may be used interchangeably. The terms refer to a single or multiple storage devices and/or media (e.g., a centralized or distributed database, and/or associated caches and servers) that store executable instructions 916 and/or data. The terms shall accordingly be taken to include, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various embodiments, one or more portions of the network 980 may be an ad hoc network, an intranet, an extranet, a virtual private network (VPN), a LAN, a wireless LAN (WLAN), a WAN, a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 980 or a portion of the network 980 may include a wireless or cellular network, and the coupling 982 may be a Code Division Multiple Access (CDMA) connection, a Global System for Mobile communications (GSM) connection, or another type of cellular or wireless coupling. In this example, the coupling 982 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

The instructions may be transmitted or received over the network using a transmission medium via a network interface device (e.g., a network interface component included in the communication components) and utilizing any one of a number of well-known transfer protocols (e.g., hypertext transfer protocol (HTTP)). Similarly, the instructions may be transmitted or received using a transmission medium via the coupling (e.g., a peer-to-peer coupling) to the devices 970. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions for execution by the machine, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Computer-Readable Medium

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals. For instance, an embodiment described herein can be implemented using a non-transitory medium (e.g., a non-transitory computer-readable medium).

Throughout this specification, plural instances may implement resources, components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components.

As used herein, the term "or" may be construed in either an inclusive or exclusive sense. The terms "a" or "an" should be read as meaning "at least one," "one or more," or the like. The presence of broadening words and phrases such as "one or more," "at least," "but not limited to," or other like phrases in some instances shall not be read to mean that the narrower case is intended or required in instances where such broadening phrases may be absent. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. The specification and drawings are, accordingly, to be regarded in an illustrative rather than a restrictive sense.

It will be understood that changes and modifications may be made to the disclosed embodiments without departing from the scope of the present disclosure. These and other changes or modifications are intended to be included within the scope of the present disclosure.

What is claimed is:

1. A method comprising:

identifying, by an execution engine, an arbitrary graph that includes a plurality of jobs for execution;

determining a retry schedule associated with the arbitrary graph, the retry schedule includes a plurality of retry attempts that are configured for one or more jobs from the plurality of jobs;

converting the arbitrary graph into a directed acyclic graph at least based on the plurality of retry attempts, the converting of the arbitrary graph comprising:

identifying a set of retry attempts of a job from the plurality of jobs, the set of retry attempts exceeding a threshold, and grouping the set of retry attempts of the job using a shared edge; and processing, by the execution engine, the directed acyclic graph.

2. The method of claim 1, further comprising:

calculating an expected processing time based on the retry schedule;

monitoring the processing of the directed acyclic graph to determine an actual processing time; and determining a graph execution status by comparing the expected processing time with the actual processing time.

3. The method of claim 1, wherein the directed acyclic graph includes the plurality of jobs connected by a plurality of edges.

4. The method of claim 3, wherein each edge in the plurality of edges comprises execution data that includes at least one of a wait duration before executing a downstream job, and an input payload for the downstream job.

5. The method of claim 3, wherein each edge in the plurality of edges connects an upstream job and a downstream job, and wherein an input payload for the downstream job comprises an output payload from the upstream job.

6. The method of claim 3, further comprising:

encoding a wait duration to each edge in the directed acyclic graph, the wait duration includes a timestamp that indicates when an execution of a next job is expected.

7. The method of claim 1, further comprising:

receiving event data from a client device;

generating the arbitrary graph based on the event data; and transmitting the arbitrary graph to the execution engine for downstream processing.

8. The method of claim 1, further comprising:

identifying a set of retry attempts of a job from the plurality of jobs, the set of retry attempts exceeding a threshold retry attempts; and grouping the set of retry attempts of the job using a shared edge.

9. The method of claim 1, further comprising:

identifying a downstream job that is associated with a set of edges connecting a set of upstream jobs, the plurality of jobs including the downstream job and the set of upstream jobs;

determining that the set of edges exceeds a threshold value; and grouping the set of upstream jobs based on types of the set of upstream jobs using one or more shared edges.

10. A system comprising:

at least one memory storing instructions; and one or more hardware processors communicatively coupled to the at least one memory and configured by the instructions to perform operations comprising:

identifying, by an execution engine, an arbitrary graph that includes a plurality of jobs for execution;

determining a retry schedule associated with the arbitrary graph, the retry schedule includes a plurality of retry attempts that are configured for one or more jobs from the plurality of jobs;

converting the arbitrary graph into a directed acyclic graph at least based on the plurality of retry attempts, the converting of the arbitrary graph comprising:

identifying a set of retry attempts of a job from the plurality of jobs, the set of retry attempts exceeding a threshold, and grouping the set of retry attempts of the job using a shared edge; and processing, by the execution engine, the directed acyclic graph.

11. The system of claim 10, wherein the operations further comprise:

calculating an expected processing time based on the retry schedule;

monitoring the processing of the directed acyclic graph to determine an actual processing time; and determining a graph execution status by comparing the expected processing time with the actual processing time.

12. The system of claim 10, wherein the directed acyclic graph includes the plurality of jobs connected by a plurality of edges.

13. The system of claim 12, wherein each edge in the plurality of edges comprises execution data that includes at least one of a wait duration before executing a downstream job, and an input payload for the downstream job.

14. The system of claim 12, wherein each edge in the plurality of edges connects an upstream job and a downstream job, and wherein an input payload for the downstream job comprises an output payload from the upstream job.

15. The system of claim 10, wherein the operations further comprise:

receiving event data from a client device;

generating the arbitrary graph based on the event data, and transmitting the arbitrary graph to the execution engine for downstream processing.

16. The system of claim 10, wherein the retry schedule associated with the arbitrary graph is determined based on an exponential backoff algorithm, and wherein the plurality of jobs includes one or more of an authentication job, a delivery job, and an archive job.

17. The system of claim 10, wherein the operations further comprise:

identifying a downstream job that is associated with a set of edges connecting a set of upstream jobs, the plurality of jobs including the downstream job and the set of upstream jobs;

determining that the set of edges exceeds a threshold value; and grouping the set of upstream jobs based on types of the set of upstream jobs using one or more shared edges.

18. A non-transitory computer-readable medium comprising instructions that, when executed by a hardware processor of a device, cause the device to perform operations comprising:

identifying, by an execution engine, an arbitrary graph that includes a plurality of jobs for execution;

determining a retry schedule associated with the arbitrary graph, the retry schedule includes a plurality of retry attempts that are configured for one or more jobs from the plurality of jobs;

converting the arbitrary graph into a directed acyclic graph at least based on the plurality of retry attempts, the converting of the arbitrary graph comprising:

identifying a set of retry attempts of a job from the plurality of jobs, the set of retry attempts exceeding a threshold, and grouping the set of retry attempts of the job using a shared edge; and processing, by the execution engine, the directed acyclic graph.

* * * * *